United States Patent [19]

Reed

[11] Patent Number: 4,654,517

[45] Date of Patent: Mar. 31, 1987

[54] OPTICAL SIGHT FOR COMPUTER CONTROLLED PLOTTER WITH IMPROVED LOCATING CAPABILITY

[75] Inventor: Ronald G. Reed, Colorado Springs, Colo.

[73] Assignee: ProtoCAD, Inc., Colorado Springs, Colo.

[21] Appl. No.: 725,416

[22] Filed: Apr. 16, 1985

[51] Int. Cl.$^4$ ................................................. G01J 1/20
[52] U.S. Cl. .................................... 250/201; 356/400
[58] Field of Search .................. 250/200, 201, 203 R, 250/548, 215, 216, 578, 234; 356/399, 400; 364/520, 559; 33/1 MP

[56] References Cited

U.S. PATENT DOCUMENTS 4,578,590   3/1986   Wu ................................... 356/400 X

*Primary Examiner*—Eugene R. LaRoche
*Assistant Examiner*—David Mis
*Attorney, Agent, or Firm*—John R. Ley

[57] ABSTRACT

An optical sight for a computer controlled plotter includes a magnifying lens positioned in an image path through the sight. The magnifying lens magnifies the image of the reference point located by the sight about an optical axis through the sight. The magnification achieves greater accuracy in locating the reference point. An electronic device which responds to light impinging thereon is positioned in the image path at the optical axis. Position signals supplied by the electronic means are related to the location of the impinging light of the reference point relative to the optical axis. The position signals are used by a computer controlling the plotter to manipulate the plotter to automatically locate the reference point.

18 Claims, 5 Drawing Figures

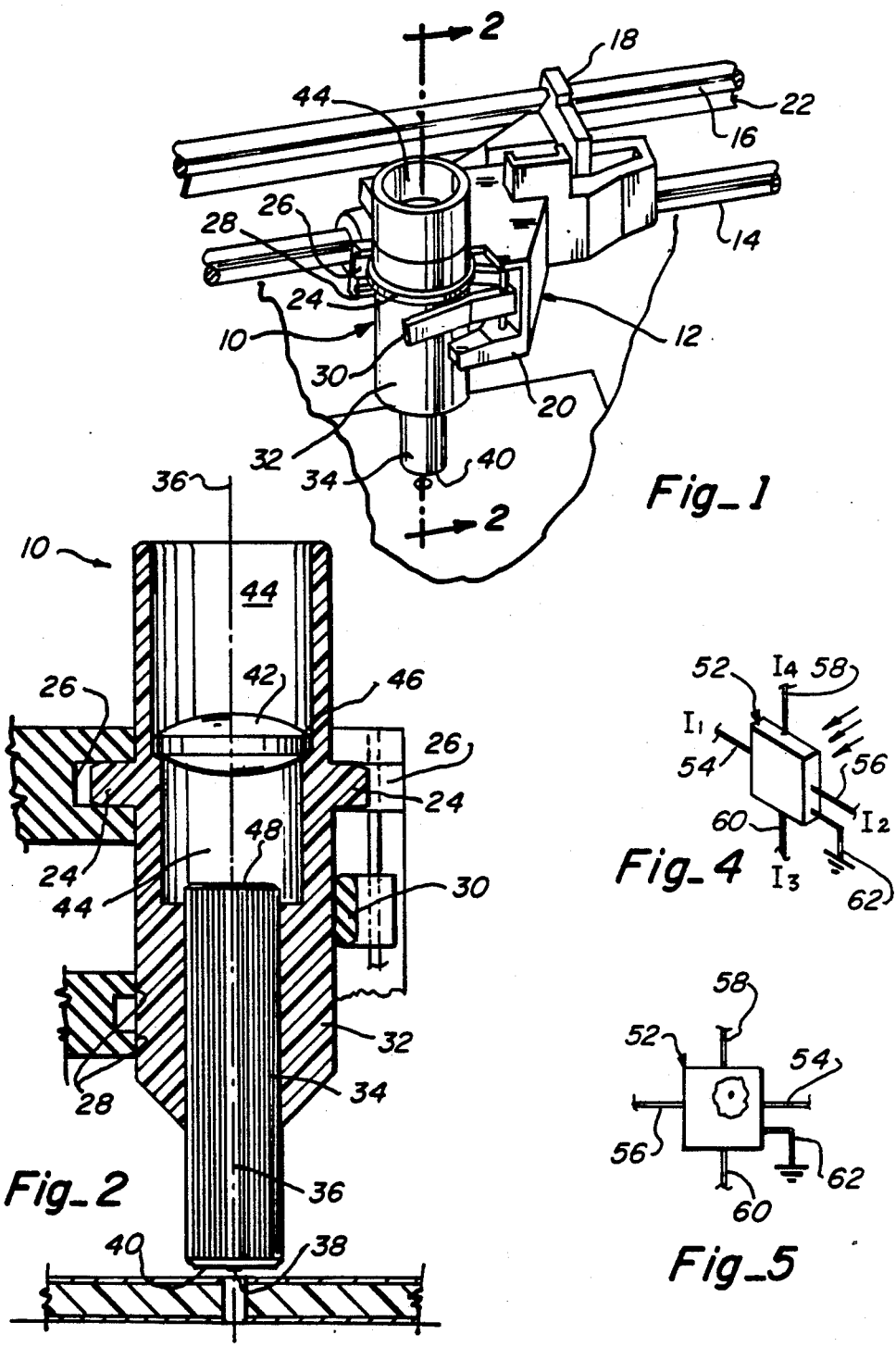

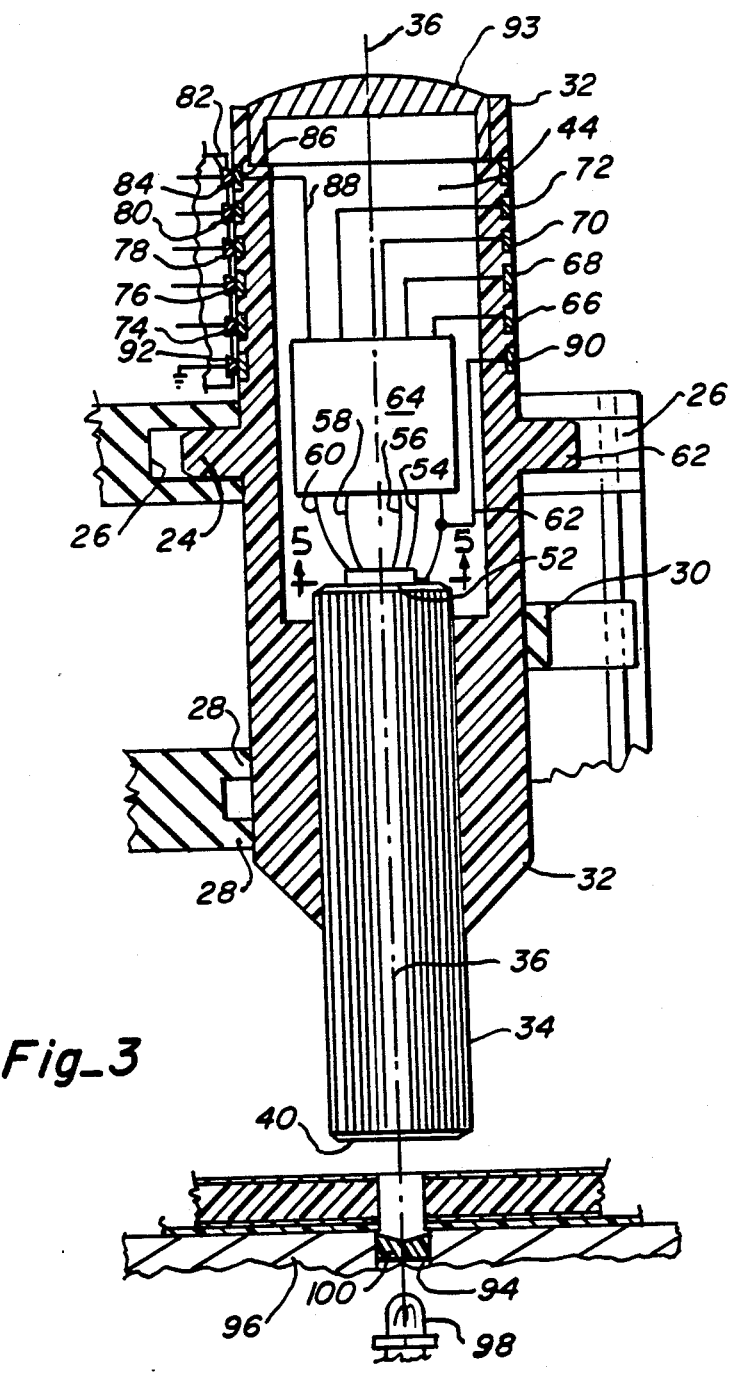
Fig_3

OPTICAL SIGHT FOR COMPUTER CONTROLLED PLOTTER WITH IMPROVED LOCATING CAPABILITY

This invention relates to an optical sight for a computer controlled plotter by which to locate a reference point on a drawing or some other material manipulated by the plotter. More specifically, the present invention relates to a new and improved optical sight which has more accuracy than previous conventional sights and which has the capability to substantially automate the reference point locating operation in computer controlled plotters.

This invention is also related to an invention for a Process For Use in Rapidly Producing Printed Circuit Boards Using a Computer Controlled Plotter, U.S. application Ser. No. 725,416, filed concurrently herewith, assigned to the assignee hereof, and incorporated herein by this reference. In this other invention for a Process for Use in Rapidly Producing Printed Circuit Boards, the printed circuit board is constructed in substantial part by using a computer contolled plotter. The present invention is advantageously used in conjunction with this Process for Use in Rapidly Producing Printed Circuit Boards, in that the present invention aids in locating reference points on the circuit board manipulated by the plotter during the practice of this Process. More generally however, the present invention may be advantageously applied in any situation where previous optical sights may have been employed.

BACKGROUND OF THE INVENTION

Conventional optical sights are used in computer controlled plotters to manually optically locate reference points on drawings or the like. Once each reference point is located, signals representative of the located reference point are caused to be sent from the plotter to the computer. The signals representative of the reference point are derived by positioning a carrier mechanism of the plotter relative to a drawing or other material upon which the reference point is located so as to align an optical axis of the sight with the reference point. The optical axis of the sight is at the same relative position on the carrier mechanism as an axis through the marking point of a pen would be if the pen were positioned in the carrier mechanism. For example, optical sights are useful to align drawings for additional or revised marking on them by a pen under the control of the plotter, or to establish a predetermined orientation between the paper or other material to be marked or otherwise operated on and the information in the computer. Successful execution of the computer software information usually requires the use of the optical sight to establish the orientation of the material prior to commencement of the procedure.

To meaningfully use the computer controlled plotter, coincidence between the optical axis of the sight and the axis of the pen is essential, or at least some predetermined relationship is essential. It is therefore usually the situation that both pens and optical sights have essentially the same exterior configuration so the axis through each remains in a single consistent position on the carrier mechanism when each is used. The external dimensions of both the pens and the optical sights are also approximately the same so that the pens and sights can automatically be interchanged on the carrier mechanism by transferring these instruments to a conventional carousel of the plotter and from the carousel to the carrier mechanism under the automatic control of the computer.

SUMMARY OF THE INVENTION

It is a principal objective of the present invention to provide a new and improved optical sight for a computer controlled plotter which attains greater accuracy in optical alignment than heretofore known to be obtainable. It is another objective to provide a new and improved optical sight for a computer controlled plotter which allows the reference point locating operations to become substantially controlled and achieved under the automatic control of the computer.

In accordance with one of its aspects, the optical sight of the present invention comprises a magnifying lens positioned in the optical path through an image conduit of the sight. The lens is centered about the optical axis of the sight, and a reticular or graticular pattern is also centered with respect to the optical axis. The lens magnifies the size of the reference point in the image path and the reticular or graticular pattern. The magnification allows the location of the optical axis to be more precisely established with respect to the reference point on the material or drawing in the plotter than is possible with a conventional sight without magnifying optics.

In accordance with another one of its aspects, the optical sight of the present invention comprises electronic means, such as a two-axis position-sensing diffuse-junction diode, located in the optical path from the image conduit. The electronic means is positioned at a predetermined location with respect to the optical axis and is operative to supply position signals related to the location at which the centroid of light from the reference point or other image intersects or impinges on the electronic means. The position signals from the electronic means are applied to signal coupling conductors at the exterior of the sight. The signal coupling conductors are located to contact mating conductors located on the carrier mechanism. The position signals are thus coupled from the optical sight to the carrier mechanism and are thereafter conducted to the computer which controls the plotter. The computer controls the carrier mechanism and the material manipulated by the plotter in relation to the position signals until the reference point image is located at the predetermined location relative to the point on the electronic means where optical axis intersects the electronic means. In this manner, reference points are precisely located under the automatic control of the computer.

The nature and details of the improved optical sight of the present invention are more completely understood by reference to the following description of the preferred embodiments taken in conjunction with the drawings, and from the appended claims.

BRIEF DESCRIPTION OF THE DRAWINGS

FIG. 1 is a perspective view of a carrier mechanism of a computer controlled plotter in which an optical sight of the present invention is retained.

FIG. 2 is a section view taken substantially in the plane of an optical axis through one embodiment of an optical sight of the present invention.

FIG. 3 is a section view taken substantially in the plane of an optical axis through another embodiment of an optical sight of the present invention.

FIG. 4 is a perspective view of a two-axis position-sensing diffuse-junction diode also shown in the embodiment of the optical sight shown in FIG. 3.

FIG. 5 is a top plan view of the diode shown in FIG. 4.

DESCRIPTION OF THE PREFERRED EMBODIMENTS

One improved optical sight 10 of the present invention is illustrated in FIG. 1 as retained in operative position on a carrier mechanism 12 of a conventional computer controlled plotter (not otherwise shown). The carrier mechanism 12 is moved transversely along a pair of vertically spaced rods 14 and 16 by a conventional stepper motor and belt drive arrangement (not shown). The carrier mechanism 12 includes a slide portion 18 which moves along the rods 14 and 16 in a fixed orientation in a plane perpendicular to the rods, and an instrument holding portion 20 which is pivotably connected to the slide portion 18. A flap 22 depends downward from the rod 16 and is operative to contact the instrument holding portion 20 and pivot it in a direction toward the plotter table (not shown) located below the rods 14 and 16. By pivoting the instrument holding portion 20, the instrument such as a marking pen (not shown) or the optical sight 10 is brought into contact with the paper or other material manipulated by the plotter. Marking can thereby be controlled by selectively pivoting the instrument holding portion to move the marking point of the pen into contact with the paper or other material. In the case of the optical sight, the pivoting movement aligns the optical axis through the sight orthogonal to the plotter table and the sheet-like paper or other material located on the plotter table.

The instrument holding portion 20 of the carrier mechanism 12 includes means for receiving and retaining each particular instrument used with the plotter, such as a pen or an optical sight, in a predetermined position so that the operative axis of each particular instrument is located at the same relative position on the carrier mechanism. An annular positioning shoulder 24 on each particular instrument is received within a receiving groove 26. A supporting ridge 28 of the instrument holding portion also contacts the exterior of the instrument. A spring-biased retaining lever 30 contacts the exterior of the instrument on the opposite side of the receiving groove 26 and the ridge 28. The lever 30 retains the instrument such as the sight 10 in the predetermined location on the carrier mechanism, but allows the instrument to be transferred from the carrier mechanism to a conventional carousel (not shown) of a conventional plotter and allows instruments to be transferred from the carousel to the carrier mechanism. These briefly described details of a computer controlled plotter are conventional. The carrier mechanism 12 illustrated in FIG. 1 is generally similar to that employed in a Hewlett Packard Model 7475A plotter, but the details of operation of the plotter are exemplary of all computer controlled plotters.

Details of the optical sight 10 are better understood by reference to FIG. 2. The optical sight 10 includes an exterior housing 32 having the annular positioning shoulder 24 formed thereon approximately midway between its upper and lower ends. An image conduit 34 extends downward from the lower end of the housing 32. The image conduit 34 is formed by a plurality of parallel aligned optical fibers retained in a rigid integral cylindrical configuration. The optical fibers extend parallel to an optical axis 36 about which the optical sight 10 is concentric. An optical alignment spot 38, or some other reticular or graticular pattern, is centered about the optical axis 36. The spot 38 is preferably located on a bottom surface 40 of the image conduit because it is easier to attach there, but the pattern could also be formed on a top surface 48 of the conduit or somewhere else in the light or image path through the axis 36 of the conduit. A bi-convex or magnifying lens 42 is positioned within an open interior space 44 within the housing 32. The optical axis of the lens 42 is coaxially positioned about the optical axis 36 of the sight. The lens 42 is attached by an adhesive to shoulders 46 formed by the housing within the interior space 44. The lens 42 is spaced a predetermined distance above a top surface 48 of the image conduit 34 in the optical path through the image conduit. This predetermined spacing focuses the lens to obtain the magnification desired relative to the size of the alignment spot 38 and the desired size of the image viewing field. In a preferred embodiment of the optical sight 10, magnification of about five times has proved very satisfactory.

The bore of the housing 32, which defines the interior space 44 in the sight 10, is preferably coated with an opaque paint to avoid glare when sighting along the optical axis 36.

Light for illuminating the reference point and the area adjoining it can pass from the upper (as shown) viewing end of the sight 10 through the image conduit 36 to the bottom surface 40. To further enhance the amount of illuminating light at the reference point, the exterior housing 32 is preferably formed of translucent plastic. Diffuse illuminating light can thereby also enter the image path through the housing where the housing is not otherwise obstructed.

Light is reflected from the reference point or other location on the material below the bottom surface 40 of the image conduit 34, and travels in an image path up the image conduit through its fiber optics in parallel alignment with the axis 36. By pivoting the instrument holding portion 20 of the carrier mechanism 12 the bottom surface 40 rests on the drawing or other material on the plotter table.

The distance between the bottom surface 40 of the image conduit and the shoulder 24 is predetermined so that the axis 36 is perpendicular to material resting on the plotter table, for example a circuit board. To achieve this perpendicularity, the thickness of that material must be considered. As an example, optical sights used to locate points on circuit boards are at least the typical thickness of a circuit board (0.0625 inch) shorter than those optical sights used to locate points on paper. The perpendicular orientation assures the accurate and consistent positioning of the carrier mechanism relative to each reference point.

The alignment spot 38 occupies approximately the same focal position as the reference or locating point when the bottom surface 40 contacts the material on the plotter table. Thus, both the alignment spot and the reference point are in focus in the image path. The light image in the optical path exiting from the top surface 48 of the image conduit is magnified by the lens 42. An observer looking downward along the axis 36 through the lens 42 and the sight 10 sees an in-focus magnified virtual image of the spot 38 and the reference point or other object which is located along the axis 36 as defined by the alignment spot 38.

Precise alignment with a conventional optical sight is somewhat difficult. The conventional optical sight is essentially similar to the sight 10 shown in FIG. 2 except that no magnifying capability or lens 42 is provided. Without the magnification achieved by the lens 42, the typical variance in alignment by a conventional non-magnifying optical sight is in the neighborhood of 0.005 inch when the target is viewed at 18 inch from the observer, utilizing a spot 38 of approximately 0.032 inch diameter. Resolutions in the neighborhood of 0.005 inch represent the physiological limits of human perception. By use of the magnifying lens 42 having a magnification capability of approximately five times in the optical sight 10, approximately four to five times greater accuracy in alignment can be achieved. The magnification overcomes inherent physiological limitations of human perception. Accuracies having variances in the neighborhood of 0.0015 inch are possible as a result of the present invention. As a result of this improved accuracy, the drawing orientation or other operation is achieved with greater accuracy.

Another embodiment of the present invention is illustrated by the optical sight 50 illustrated in FIG. 3. Many of the elements of the optical sight 50 are essentially the same as those included in the optical sight 10 (FIG. 2). Specifically, the housing 32, the positioning shoulder 24 and the image conduit 34 are all essentially similar and are located concentricly about the optical axis 36. However, no reticular or graticular alignment pattern is provided on the bottom surface 40 of the image conduit. At the top surface 48 of the image conduit 34 a conventional two-axis position-sensing diffuse-junction diode 52 is attached. Preferably the geometric center of the diode 52 is coincident with the axis 36.

The two-axis position-sensing diffuse-junction diode 52 is illustrated in FIGS. 4 and 5. The diode 52 is a conventional item which responds to light impinging on it. Four conductors 54, 56, 58 and 60 are connected to terminals on each quadrant of the diode. Due to the diffuse-junction characteristics of the diode 52, light impinging on the diode will modify or cause current signals to flow in each of the four conductors 54, 56, 58 and 60. The relative magnitudes of the current flowing in each of the four conductors is dependent upon the location of the centroid of the point or points of maximum intensity of the light impinging on the diode 52. As is illustrated in FIG. 5, if the the location of the centroid of the impinging light beam is displaced somewhat from the geometric center of the diode, the currents flowing through all four conductors are modified in relation to the physical location of this centroid of the impinging light beam, as compared to the situation in which the location of centroid of light is located at the geometric center of the diode 52. Thus by sensing the current in each of the four conductors 54, 56, 58 and 60, electrical position signals are obtained which are related to the location of the centroid of the impinging light with respect to the geometric or electrical center of the diode 52. With the geometric or electrical center of the diode located on the optical axis 36 in the sight 50 as shown in FIG. 3, the position signals relate directly to the location of the reference point relative to the optical axis. Although not shown, trimming resistors can be connected to the four conductors to modify the signals appropriately and thereby electronically adjust the relative magnitudes of the signals delivered from the diode 52. The trimming resistors adjust the electronic center of response of the diode, to thus allow adjustments for physical dimensions such as the location of the geometric center of the diode relative to the optical axis and to compensate for individual peculiarities in the response of different diodes. As shown in FIGS. 4 and 5, an additional reference conductor 62 is provided for referencing the diode 52 to ground potential.

The sight 50 includes electronic means for deriving signals representative of the location of the reference point image in the image path relative to the optical axis 36, as shown in FIG. 3. The electronic means includes the diffuse-junction diode 52 and a pre-amplifier (pre-amp) 64. Each of the conductors 54, 56, 58 and 60 is electrically connected to the pre-amp 64. The pre-amp amplifies and buffers the position signals derived from the conductors 54, 56, 58 and 60 and supplies related output position signals to exterior coupling or ring conductors 66, 68, 70 and 72. The ring conductors 66, 68, 70 and 72 are located at the exterior surface of the housing 32. The ring conductors 66, 68, 70 and 72 are adapted to make electrical contact with mating contacts 74, 76, 78 and 80 respectively, carried on a support 82 of the carrier mechanism when the sight 50 is retained on the carrier mechanism. The electrical position signals representative of the image impinging on the diffuse-junction diode 52 are therefore supplied by the optical sight 50 to the mating contacts on the carrier mechanism. These position signals are operatively conducted from the plotter to the computer, and the computer can correlate these four signals with the position of the carrier mechanism in order to move the carrier mechanism and/or the material on which the reference point is located to precisely align the optical axis 36 through the sight 50 with the reference point. Electrical power for the pre-amp 64 is supplied by a power contact 84 which makes electrical connection with a power coupling ring conductor 86. A conductor 88 connects the ring conductor 86 with the pre-amp. The reference conductor 62 is connected to a reference coupling ring conductor 90 which contacts a reference contact 92 on the support 82 of the carrier mechanism. The pre-amp 64 is also electrically connected to the reference conductor 62.

A cap 93 is attached to the upper end of the housing 32 to enclose the electronic means within the interior space 44.

To obtain a source of light for the image of the reference point on the diode 52, an opening 94 is formed in the plotter table 96 and a source of light 98 is placed behind the opening. A frosted plastic diffusion lens 100 is placed in the opening 94. Light is projected from the source 98 through the lens 100 onto the paper or material resting on the plotter table to create an image of sufficient intensity impinging on the diode 52 to cause it to operate in the manner described.

Instead of the two-axis position sensing diffuse-junction diode 52 as illustrated in FIG. 3, a charge coupled device array could be used as an alternative.

The nature, details and improvements available from the present invention have been described with a degree of specificity. It should be understood, however, that the description has been made by way of prefered example and that the invention is defined by the scope of the appended claims.

What is claimed is:

1. An optical sight for a computer controlled plotter for use in locating a reference point, comprising a housing, means associated with the housing for positioning the sight on a carrier mechanism of the plotter with an optical axis through the sight located at a predetermined position with respect to the carrier mechanism, an image conduit connected to the housing and operative for conducting light from the reference point in an image path through the conduit, means defining a reticule positioned within the image path and which is operatively centered with respect to the optical axis, and an improvement in combination therewith comprising:

magnifying means positioned in the image path and operative for magnifying the image of the reference point.

2. An optical sight as defined in claim 1 wherein said magnifying means further magnifies an image of the reticule.

3. An optical sight as defined in claim 2 wherein the reticule is positioned on the image conduit.

4. An optical sight as defined in claim 2 wherein said magnifying means comprises a bi-convex lens having an optical axis coaxial with the optical axis of said sight.

5. An optical sight as defined in claim 4 wherein the housing defines an interior space and the bi-convex lens is positioned within the interior space at a predetermined position spaced from one end of the image conduit.

6. An optical sight as defined in claim 5 wherein the interior space within the housing is open at one end of the housing for optical sighting along the optical axis through the lens and the image conduit.

7. An optical sight as defined in claim 6 wherein the image conduit extends from the housing to another end adapted to be positioned adjacent the reference point, and the reticule is positioned on the other end of the image conduit.

8. An optical sight as defined in claim 2 wherein said housing allows light from the exterior of said sight to enter the image path and be conducted through the image conduit to illuminate the reference point.

9. An optical sight for a computer controlled plotter for use in locating a reference point on a drawing or other material manipulated by the plotter, comprising a housing, means for positioning the sight on a carrier mechanism of the plotter with an optical axis through the sight located at a predetermined position with respect to the carrier mechanism, an image conduit of the sight extending along the optical axis and operative for conducting light from the reference point in an image path through the conduit, and an improvement in combination therewith comprising:

electronic means positioned in the image path at the optical axis and operative in response to light impinging thereon for supplying at least one position signal related to the location of the impinging light relative to the optical axis, and conductor means for conducting the position signal from the sight.

10. An optical sight as defined in claim 9 wherein the electronic means comprises a position sensing diode.

11. An optical sight as defined in claim 9 wherein the electronic means supplies a plurality of position signals and each position signal is related to the location of the centroid of the impinging light relative to the electrical center of the electronic means.

12. An optical sight as defined in claim 11 wherein the electronic means comprises a two-axis position-sensing diffuse-junction diode.

13. An optical sight as defined in claim 12 wherein the electronic means further comprises an amplifier means operatively receiving the position signals from the diode and operative for amplifying the position signals.

14. An optical sight as defined in claim 13 wherein said conductor means further comprises a plurality of coupling conductors located at the exterior of the housing, and wherein each amplified signal from the amplifier means is operatively conducted to a separate coupling conductor.

15. An optical sight as defined in claim 14 wherein each coupling conductor is a ring conductor extending around the exterior of the housing.

16. An optical sight as defined in claim 15 further comprising mating means associated with the plotter for contacting each coupling conductor located at the exterior of the housing, the mating means operative for conducting the amplified signals from the optical sight.

17. An optical sight as defined in claim 16 further comprising a power coupling conductor located at the exterior of the housing and electrically connected to the amplifier means for supplying electrical power to the amplifier means, and power mating means associated with the plotter for contacting and applying electrical power to the power coupling conductor.

18. An optical sight as defined in claim 11:

wherein said conductor means further comprises a plurality of coupling conductors located at the exterior of the housing, and further comprising means associated with the plotter for contacting the plurality of coupling conductors at the exterior of the housing to conduct the position signals from the optical sight.

* * * * *